(12) United States Patent
Schog et al.

(10) Patent No.: US 7,377,368 B2
(45) Date of Patent: May 27, 2008

(54) DISC BRAKE WITH BRAKE LININGS GUIDED ON BOLTS

(75) Inventors: Michael Schog, Mertloch (DE); Karl-Heinz Wollenweber, Ochtendung (DE); Christian Schroeter, Sinzig (DE); Dirk Hees, Mayen (DE); Guido Zenzen, Macken (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/229,891

(22) Filed: Sep. 19, 2005

(65) Prior Publication Data

US 2006/0060430 A1 Mar. 23, 2006

Related U.S. Application Data

(63) Continuation of application No. PCT/EP2004/002606, filed on Mar. 12, 2004.

(30) Foreign Application Priority Data

Mar. 20, 2003 (DE) ................. 103 12 480

(51) Int. Cl.
*F16D 55/00* (2006.01)
(52) U.S. Cl. .............. 188/73.31; 188/73.45; 188/253; 188/258; 188/261
(58) Field of Classification Search ........... 188/73.31, 188/73.39, 73.41–73.45, 234, 247, 253, 257, 188/258, 261, 250 R, 250 D, 250 E, 250 G, 188/250 B, 251 A
See application file for complete search history.

(56) References Cited

U.S. PATENT DOCUMENTS

| | | | |
|---|---|---|---|
| 3,298,468 A | 1/1967 | Buyze | |
| 3,915,263 A | 10/1975 | Courbot | |
| 4,093,043 A * | 6/1978 | Smith | 188/73.46 |
| 4,219,106 A | 8/1980 | Lüpertz et al. | |
| 4,355,707 A | 10/1982 | Saito | |
| 5,860,496 A * | 1/1999 | Kullman et al. | 188/73.45 |
| 6,039,155 A * | 3/2000 | Demoise, Jr. | 188/73.39 |
| 6,062,349 A * | 5/2000 | Boisseau et al. | 188/73.45 |

FOREIGN PATENT DOCUMENTS

| | | |
|---|---|---|
| DE | 1 238 284 | 4/1967 |
| DE | 1 505 491 | 9/1969 |
| DE | 2 211 013 | 9/1973 |
| DE | 28 45 404 | 5/1979 |
| DE | 28 04 808 | 8/1979 |
| DE | 30 42 601 | 6/1982 |
| DE | 32 22 956 | 12/1983 |
| DE | 41 15 064 | 12/1992 |
| DE | 44 16 815 | 11/1995 |
| DE | 44 18 955 | 12/1995 |
| DE | 101 13 347 | 12/2001 |
| GB | 1173698 | 12/1969 |
| GB | 2 006 356 | 5/1979 |

* cited by examiner

*Primary Examiner*—Pam Rodriguez
(74) *Attorney, Agent, or Firm*—MacMillan, Sobanski & Todd, LLC (57) ABSTRACT

A disc brake has a brake carrier (10) with at least two bolts (16*a*, 16*b*, 18*a*, 18*b*) which stand axially to the brake disc for guiding a brake lining (32*a*, 32*b*). The plane (P) spanned by the bolt axes has a smaller radial distance (D) from the disc axis (A) than the centroid of the friction lining.

12 Claims, 10 Drawing Sheets

DISC BRAKE WITH BRAKE LININGS GUIDED ON BOLTS

CROSS-REFERENCE TO RELATED APPLICATIONS

This application is a continuation of International Application No. PCT/EP2004/002606 filed Mar. 12, 2004, the disclosures of which are incorporated herein by reference in entirety, and which claimed priority to German Patent Application No. 103 12 480.2 filed Mar. 20, 2003, the disclosures of which are incorporated herein by reference in entirety.

BACKGROUND OF THE INVENTION

The invention relates to a disc brake with a brake carrier, able to be fixed to the vehicle and having bolts, and with brake linings and a caliper or frame.

Brakes of this kind are generally known. The brake linings, consisting of a carrying plate and a friction lining, are normally guided axially in relation to the brake disc by means of bolts fixed to the brake carrier. With disc brakes "axially" means in general: in a direction parallel to the axis of rotation of the brake disc. "Radially" means correspondingly a direction perpendicular to an axial direction in the above sense.

The prior art of disc brakes of this kind is represented by, e.g. the following patent documents: DE 1238284, DE 1505491 and corresponding U.S. Pat. No. 3,298,468, both of which are incorporated by reference herein in entirety, DE 1 575920, DE 2804808 and corresponding U.S. Pat. No. 4,219,106, both of which are incorporated by reference herein in entirety, DE 2845404, DE 4115064 and DE 4 416 815. Further patent documents which also belong to the prior art are DE 101 13 347, DE 2 211 013 and U.S. Pat. No. 3,915,263.

The present invention is also dedicated to these technical features.

A persistent technical problem definition in designing disc brakes is the reduction of manufacturing expense and the weight of the brake with simultaneous high functional reliability and low maintenance expense. The two latter-mentioned standard aims also include in particular the avoidance of susceptibilities to failure of the brake caused by rust. A particular problem in all brake designs is the avoidance of squeaking noises due to oscillations.

The present invention is also dedicated to these technical objectives.

BRIEF SUMMARY OF THE INVENTION

The disc brake according to the invention has in a known way a brake carrier, which can be fixed to the vehicle frame and is provided with bolts, for guiding a brake lining axially in relation to the disc brake. The brake lining has retainers for the bolts, in which the bolts engage. The technical aims alluded to above are achieved according to the invention in that the plane going through the central axes of the bolts has a smaller radial distance from the disc axis than the centroid of the friction lining of the brake lining and the brake lining has linear contact in the retainers with the bolts associated in each case.

It is preferably provided that said distance between the plane and the disc axis is smaller by at least 5%, preferably at least 10% and further preferred at least 15% than the radial distance of the centroid of the friction lining from the disc axis.

A preferred variant of the invention provides that the brake lining arranged on the outside of the vehicle is guided on bolts, the central axes of which span a plane, the distance of which from the disc axis is smaller than the distance of the centroid of the friction lining from the disc axis.

Another variant of the invention provides that the above circumstances apply to both brake linings on the inside of the vehicle and on the outside of the vehicle.

According to another variant of the invention it is provided that the central axes of the bolts have a smaller radial distance from the disc axis than the centroid of the friction lining of the brake lining. In this variant of the invention said difference between the distances may also amount to 5% or 10%, related in each case to the larger distance, in other words the distance of the centroid F from the disc axis A.

A preferred configuration of the invention provides that the brake linings have U-shaped recesses in which the bolts engage. Said U-shaped recesses preferably extend parallel to the symmetrical plane of the brake, i.e. the central axes of the recesses (which are also symmetrical axes of the recesses as such) extend parallel to the symmetrical plane of the brake, in other words the plane going through the centroid F of the friction lining and the axis of rotation A of the brake disc in the unbraked state of the brake and perpendicular to the friction lining.

Instead of said U-shaped recesses, holes can also be provided in the brake linings for retaining an associated bolt in each case. Elongated holes in the brake linings are also possible, wherein their longitudinal axes, in other words the central axes extending in the longitudinal direction of the elongated holes, extend perpendicular to the symmetrical plane of the brake.

The invention also relates to brake linings for use with a disc brake of said kind.

The invention further relates to a method for producing a disc brake of this kind.

Other advantages of this invention will become apparent to those skilled in the art from the following detailed description of the preferred embodiments, when read in light of the accompanying drawings.

Further preferred configurations of the invention are communicated in the dependent claims and in the following description of embodiment examples.

DETAILED DESCRIPTION OF THE INVENTION

In the following figures different embodiment examples are illustrated, wherein components which are functionally identical or functionally similar to one another are characterised by the same reference symbols.

As illustrated in particular in FIGS. 1, 2, 5, 6, a brake carrier 10 has two arms 10a, 10b. Above the brake carrier is arranged a caliper 12, which in the embodiment examples illustrated is constructed as a floating caliper and in two parts. The caliper further has a section 12a inside the vehicle and a section 12b outside the vehicle. The sections 12a, 12b are rigidly connected to one another by screws 26a, 26b, 26c, 26d (cf. FIGS. 2 and 7). The brake carrier 10 is fastened rigidly to the vehicle in the normal way, holes 14a, 14b and screws (not shown) serving this purpose.

Figure 5:
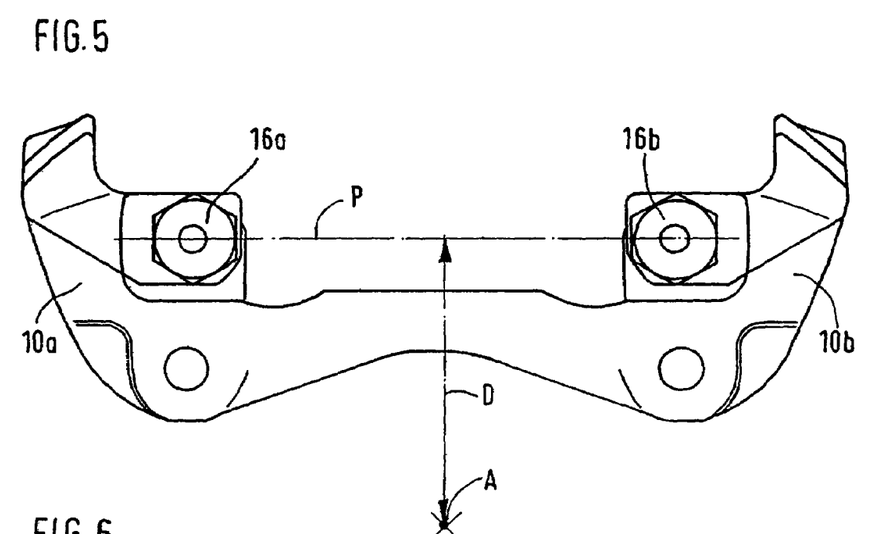
FIG. 5 shows the brake carrier in front view.
Figure 6:
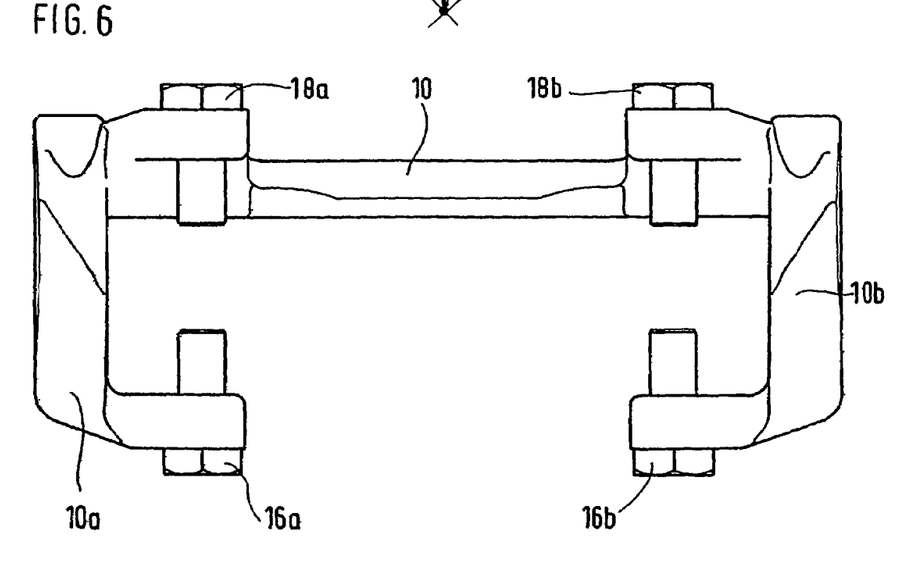
FIG. 6 shows the brake carrier in horizontal projection.

As FIG. 6 (and FIGS. 1, 3, 4, 5) in particular shows, bolts 16a, 16b, 18a, 18b are rigidly connected to the brake carrier 10. Said bolts are provided over part of their longitudinal extension with an outer thread which is screwed into a matching inner thread in the brake carrier 10. The sections of the bolts exposed in FIG. 6 (in other words the sections not covered by the brake carrier in FIG. 6) are without threads. These sections of the bolts 16a, 16b, 18a, 18b serve, as described in greater detail below, to support the brake linings.

Figure 3:
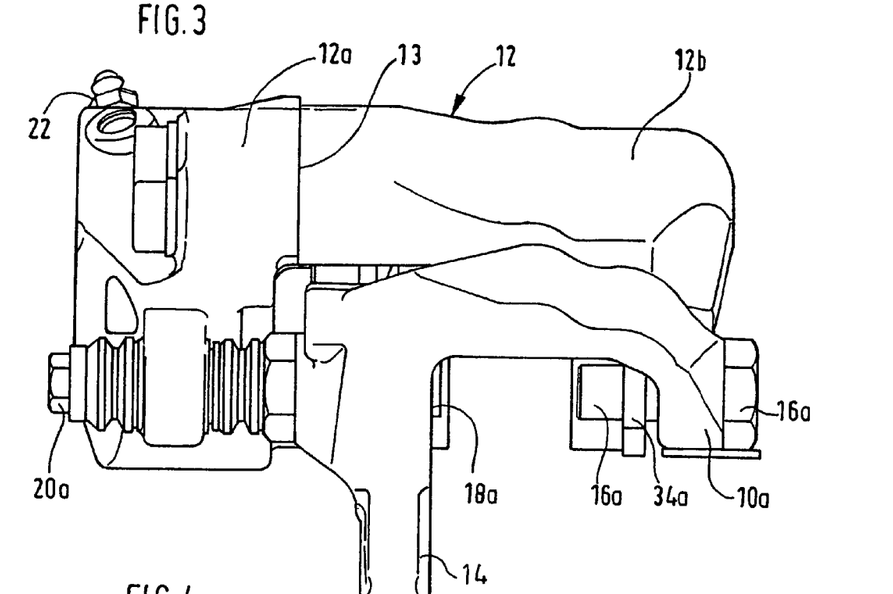
FIG. 3 shows the disc brake according to FIGS. 1 and 2 from the side, i.e. in the direction of the plane of the brake disc.
Figure 4:
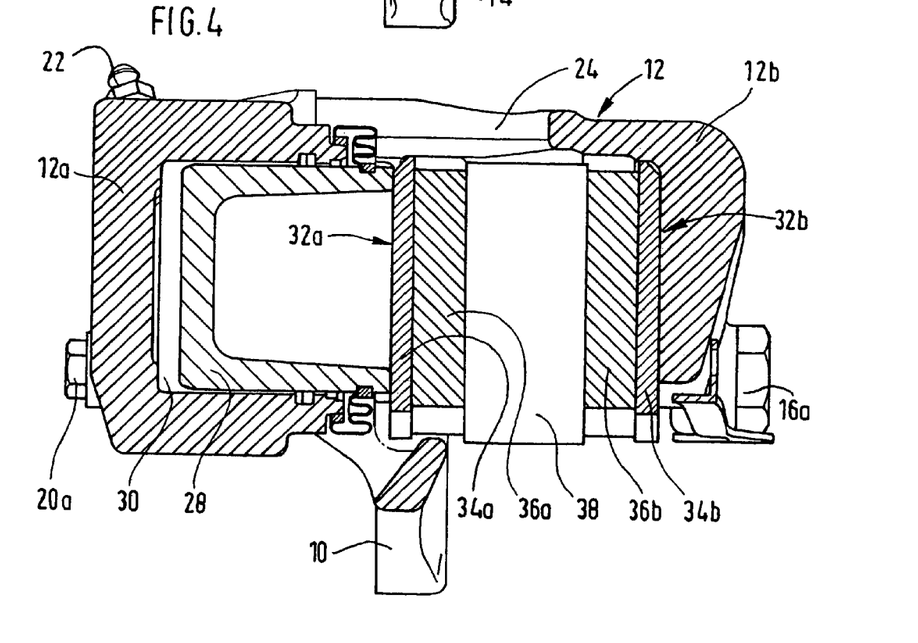
FIG. 4 shows the disc brake according to FIGS. 1 to 3 in section.
Figure 7:
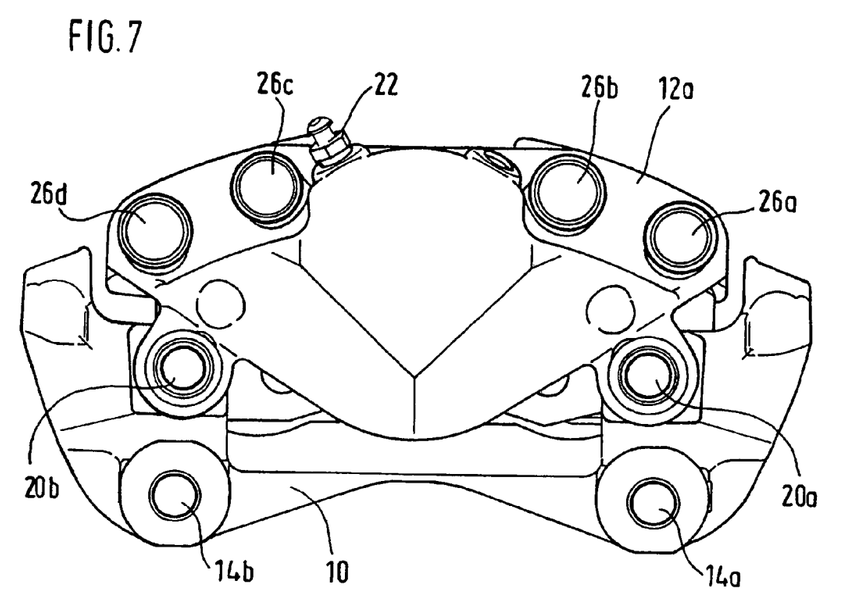
FIG. 7 shows the disc brake according to FIGS. 1 to 6 in rear view, i.e. in the mounted state from the inside of the vehicle outwards.

As can be seen in particular in FIGS. 3, 4, 7 the floating caliper 12 slides on bolts 20a, 20b. Bolts 20a, 20b are screwed into bolts 18a, 18b located on the inside of the vehicle, co-axially in fact, as can be seen in particular from FIG. 3. Bolts 18a, 18b are for this purpose provided centrally with an inner thread into which an outer thread of bolts 20a, 20b can be screwed in each case. Bolts 20a and 18a and also bolts 20b, 18b are thus in each case coaxial to one another (cf. FIG. 3). Bolts 16a, 18a are likewise coaxial and also bolts 16b, 18b (FIG. 6).

Figure 2:
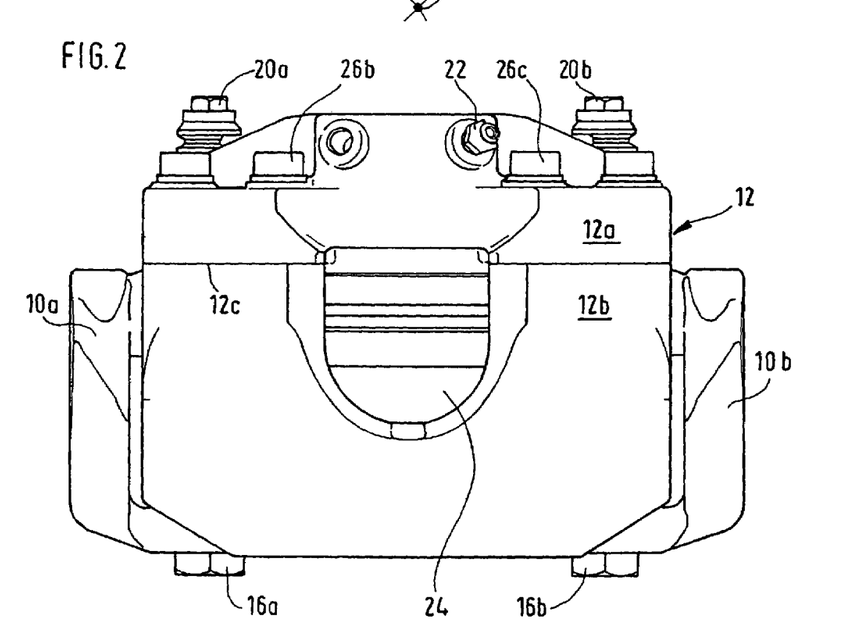
FIG. 2 shows the disc brake according to FIG. 1 in horizontal projection, from above on to the caliper.

According to FIGS. 2 and 7 the two floating caliper sections 12a, 12b are rigidly connected to one another by screws 26a, 26b, 26c, 26d. The contact face of the two caliper sections 12a, 12b is designated as 12c in FIG. 2.

Brake fluid is conducted into a fluid chamber 30 in normal manner via a fluid inlet 22 to move the piston 28 (cf. FIG. 4). If, therefore, the fluid pressure is increased in the chamber 30, the piston 28 moves to the right in FIG. 4 and the caliper 12 correspondingly to the left.

Figure 8:
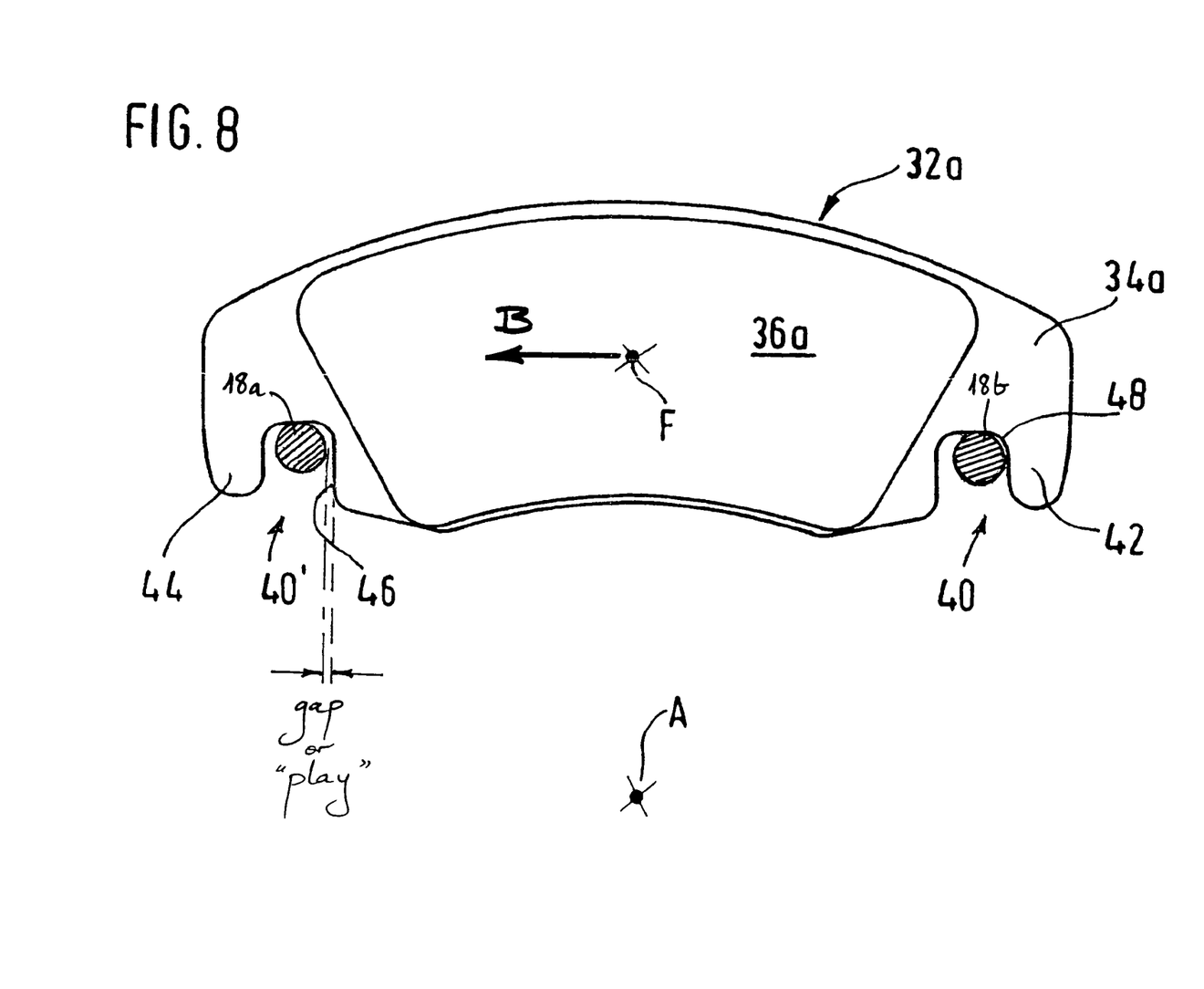
FIG. 8 shows a brake lining for use in a disc brake according to FIGS. 1 to 7.

FIG. 8 shows one (32a) of the two identically constructed brake linings 32a, 32b (cf. also FIG. 4). Brake lining 32a consists of a carrying plate 34a (made of metal) and a friction lining 36a. The friction lining 36a wears due to friction during braking. FIG. 8 also shows the centroid F of the friction lining 32a. The brake lining has on the run-in side and on the run-out side of the brake in each case a U-shaped recess 40, 40'. FIG. 8 also shows schematically the axis of rotation A of the brake disc 38 (latter not shown in FIG. 8, cf. FIG. 4).

The brake linings 32a, 32b are placed with their U-shaped recesses 40, 40' on to the threadless sections of the bolts 16a, 16b or 18a, 18b from above. This results in a linear contact between a wall in the recesses 40, 40' and the surface of the respective bolt 16a, 16b, 18a, 18b.

Figure 1:
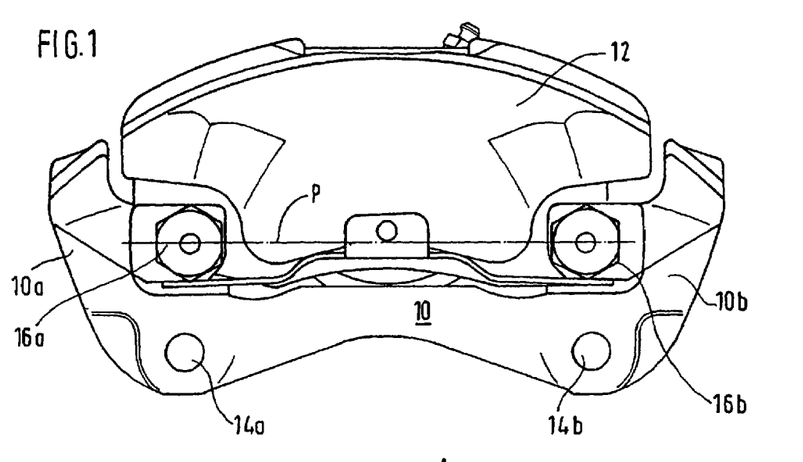
FIG. 1 shows a disc brake in front view, i.e. in the mounted state from the outside of the vehicle inwards.

The brake components, in particular the positions of the bolts 16a, 16b, 18a, 18b and the distances between the recesses 40, 40' in the brake linings 32a, 32b and also the recesses 40, 40' themselves are dimensioned in such a way that the longitudinal axes of the bolts 16a, 16b, 18a, 18b span a plane which therefore goes through these axes, the distance of which from the axis of rotation A of the brake disc (cf. FIG. 8) is smaller than the distance of the centroid F of the friction lining from this axis of rotation A. In FIGS. 1 and 5 the plane spanned by the central axes of the bolts is designated by "P". The position of the axis of rotation A of the disc brake standing perpendicular to the plane of projection is also schematically illustrated. Naturally, the radial distance of this disc axis from said plane results from the drawing of the perpendicular on to the plane, in other words this means the perpendicular distance. This is distance "D" according to the figure.

Furthermore, said dimensions of the brake components are chosen in such a way that when a braking force is initiated which the vehicle is able to brake up to approximately 0.1 g, only tensile forces act on the brake linings. If in FIG. 8 the brake disc rotates anti-clockwise about the axis A, the run-in side of the brake is on the right, in other words corresponding to recess 40, whereas the run-out side of the brake is on the left, corresponding to recess 40'. With braking forces which with good friction engagement between the tyres and the roadway do not exceed said maximum vehicle slowing down of 0.1 g, only tensile forces therefore occur on the brake lining 32a, i.e. on the run-in side (FIG. 8, right) the braking forces are absorbed by the inlet-side projection 42 of the brake lining (the friction forces act to the left in FIG. 8). Not until a braking force above a slowing down of 0.1 g is initiated does the overrun face 46 of the brake lining impact against the associated bolt in recess 40' and the braking forces are absorbed by tensile forces (projection 42) and compressive forces (on face 46).

The dimensions of the brake are further chosen in such a way that during transmission of a braking force resulting from a hydraulic braking pressure of up to approximately 10 bar and corresponding to a vehicle slowing down of up to approximately 1 m/s², only the described tensile forces act on the brake lining (brake linings 32a, 32b), whereas with hydraulic braking pressures of more than 30 bar, corresponding to a vehicle slowing down of more than 3 m/s², both tensile forces and appreciable compressive forces (as described above) always act on the brake linings. In the transition range between 10 and 30 bar a gradually increasing force transmission is initiated by pressure. This means that the brake carrier can be built as light (with little weight). High circumferential forces are favourably distributed over both carrier arms.

The above-mentioned force transmissions by tensile force or pressure are preferably chosen for the brake lining on the outside of the vehicle. For the brake linings arranged on the inside of the vehicle the dimensions are preferably chosen in such a way that they are largely subject to tensile forces.

Figure 9:
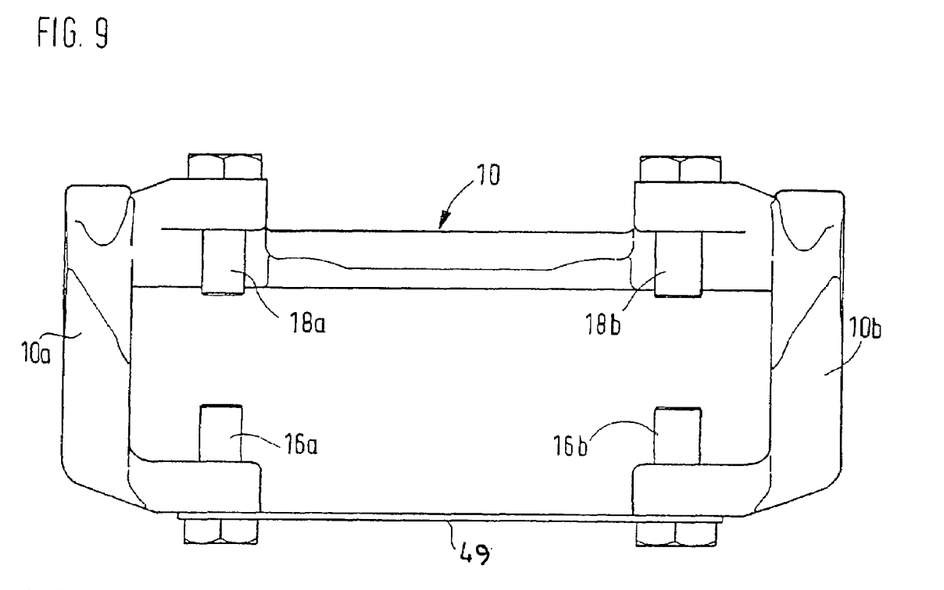
FIG. 9 shows a configuration of the brake carrier in horizontal projection.
Figure 10:
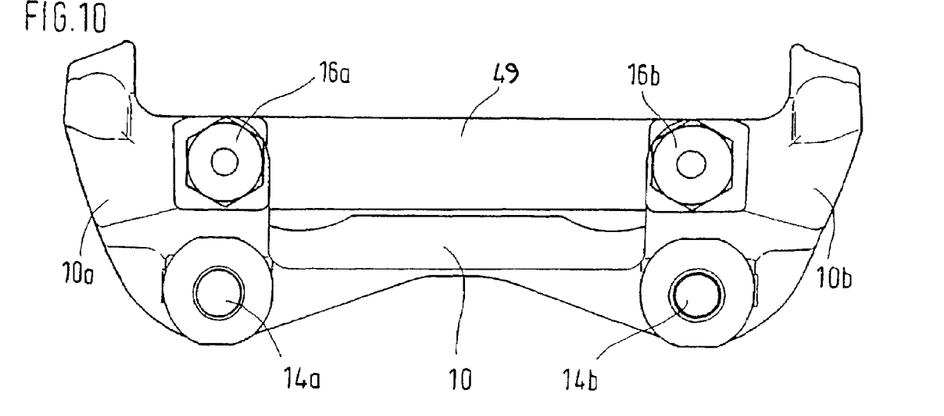
FIG. 10 shows the brake carrier according to FIG. 9 in rear view.

FIGS. 9 and 10 show a particular configuration of the brake, in which the brake carrier 10 is provided on the outside of the vehicle with a bridge 49, which connects the free arms 10a, 10b of the brake carrier 10 to one another. The bridge 49 may consist, e.g. of sheet metal and is screwed down by bolts 16a, 16b. The bridge 49 reinforces the brake carrier and can transmit forces. It can also serve, e.g. to attach an identifier or trademark.

The bridge 49 can also be configured as a multi-layered metal sheet, in particular be provided with damping material, preferably in a sandwich construction with the damping layer between layers of metal. Preferably no damping material is provided in the area of the screwing down locations (bolts 16a, 16b).

The U-shaped recesses 40, 40', according to FIG. 8, have rounded transitions on their floors between the side faces, wherein the transition radii (cf. reference symbol 48) are smaller than the radii of the supporting bolts 16a, 16b, 18a, 18b. This makes it possible to define the contact lines between the brake lining and the bolt more precisely.

The small, preferably linear contact faces of the bolts in the U-shaped recesses 40, 40' enable any corrosive products to be removed owing to the high surface pressure, Oscillations are very largely avoided.

In the U-shaped recesses 40, 40' a metal damping sheet, for example, adapted to the U in shape, may be arranged, in other words between the bolt and the wall of the recess. The bolts 16a, 16b, 18a, 18b can also be provided with a sleeve, in particular a spring (elastic) sleeve, which likewise can cause increased damping of oscillations.

The above-described brake also has in particular the advantage that it is easy to manufacture and mount. Drilling, making symmetrical and thread-cutting are all that are needed for the metal-removing machining of the brake carrier during manufacture.

Figure 11:
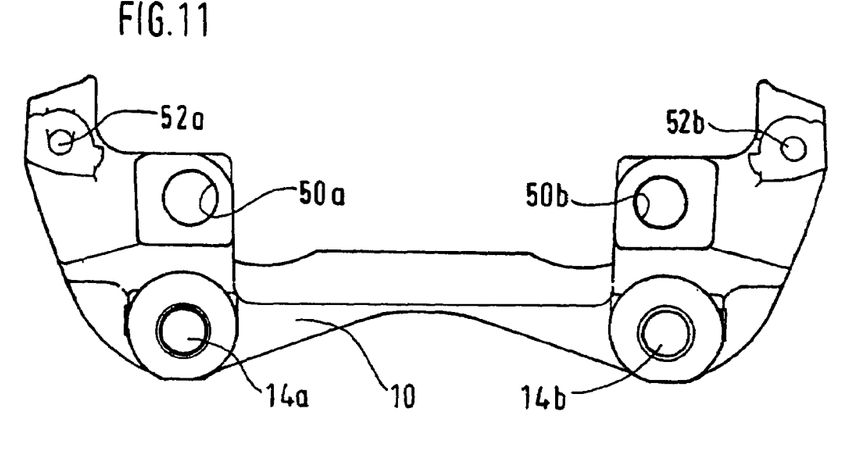
FIG. 11 shows a modified embodiment example of a brake carrier.

FIG. 11 shows a brake carrier 10 modified in respect of the embodiment example according to FIG. 6. In conformity with the embodiment example according to FIG. 6, in the brake carrier 10 according to FIG. 11 threaded bores 50a, 50b are also moulded out for retaining the bolts 16a, 16b, 18a, 18b (not shown in FIG. 11). In a modification of the embodiment example according to FIG. 6, in the embodiment example of the brake carrier according to FIG. 11 the bolts for guiding the caliper are not screwed coaxially into the bolts supporting a brake lining, but instead separate threaded bores 52a, 52b are provided on the brake carrier 10 for retaining bolts (cf. FIG. 16, reference symbol 56a) on which the caliper can slide axially.

Figure 14:
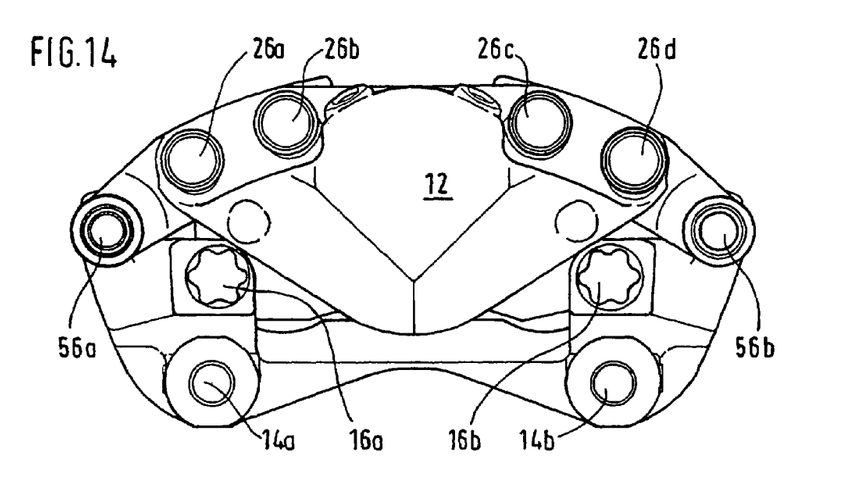
FIG. 14 shows the embodiment example of a brake according to FIG. 11 with caliper in rear view (i.e. seen from the inside of the vehicle outwards).
Figure 15:
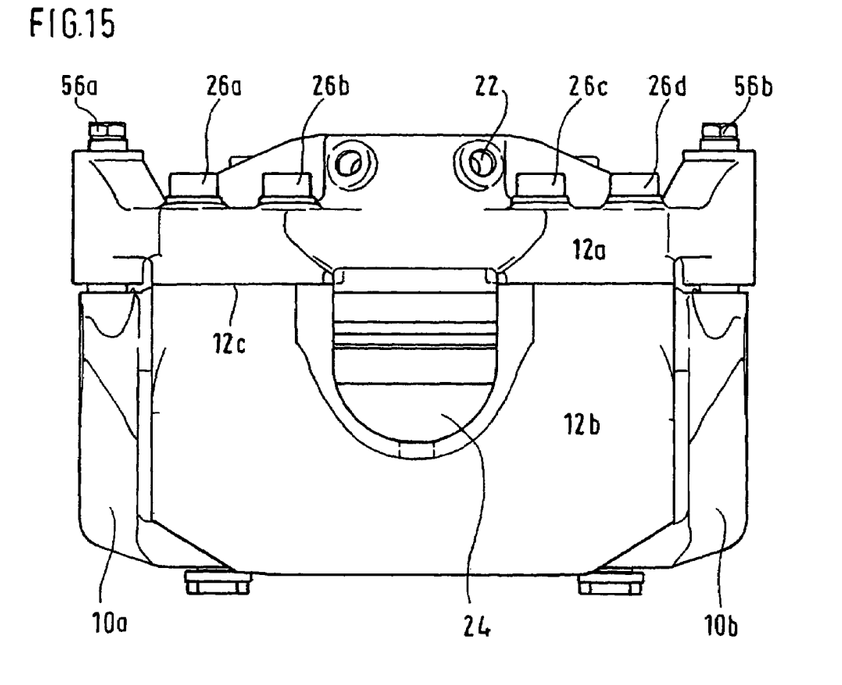
FIG. 15 shows the embodiment example of a brake according to FIGS. 11 and 14 in horizontal projection.
Figure 16:
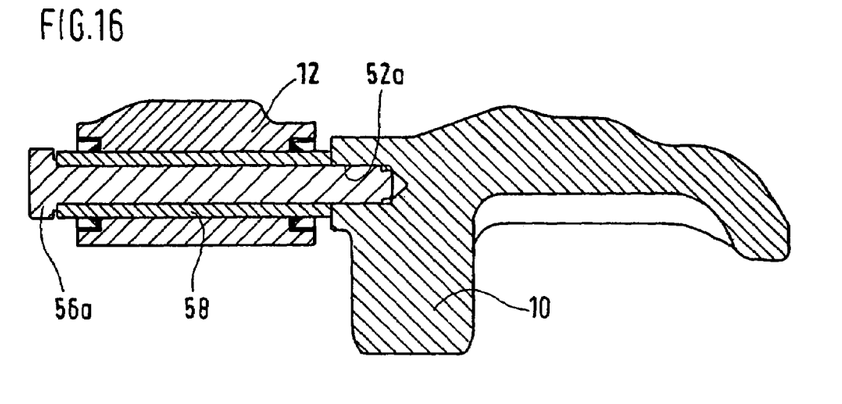
FIG. 16 shows the fixing of the floating caliper to the brake carrier in the embodiment example of the brake according to FIGS. 11, 14, 15.

The brake with a brake carrier according to FIG. 11 otherwise, in other words apart from the guiding of the caliper by the threaded bores 52a, 52b and corresponding bolts 56a (cf. FIG. 16), corresponds to the embodiment example according to FIGS. 1 to 10. This is illustrated in FIGS. 14, 15 and 16, where the components and elements which have the same or at least a similar function to corresponding components in the embodiment example according to FIGS. 1 to 10 bear the same reference symbols as in FIGS. 1 to 10. In a modification of the above-described embodiment example the floating caliper 12 therefore slides on bolts 56a, 56b which are screwed into threaded bores 52a, 52b (FIG. 11).

Figure 12:
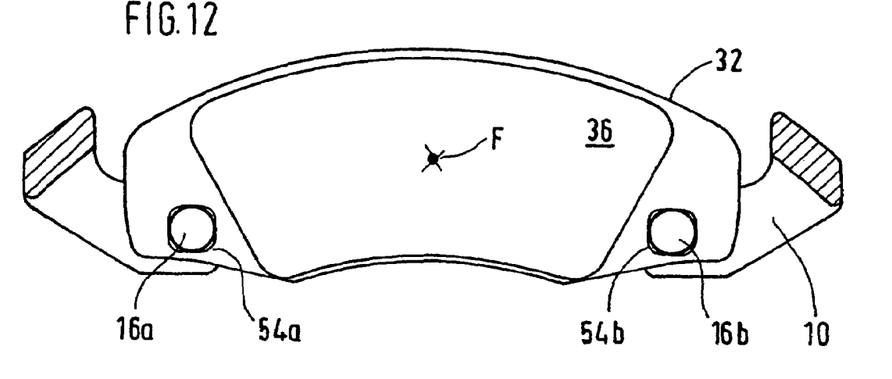
FIG. 12 shows a modified embodiment example of a brake lining with a brake carrier partly in section.

FIG. 12 shows a brake lining 32, modified in respect of the embodiment example according to FIG. 8, with a friction lining 36. This brake lining 32 is illustrated slightly enlarged in FIG. 13 without the brake carrier 10.

In the embodiment examples according to FIGS. 1 to 17 the bolts 16a, 16b, 18a, 18b on which the brake linings are supported are cylindrical in the support area in each case.

FIG. 16 shows the detail, already mentioned above, of the support of the floating caliper 12 on the brake carrier 10 by means of a bolt 56a (the other side of the brake is correspondingly configured with a bolt 56b, cf. FIG. 14), which is screwed into a threaded bore 52a in the brake carrier 10. A sleeve 58 known per se is located between the bolt 56a and the caliper 12. The sliding guide is sealed in the normal way.

Figure 17:
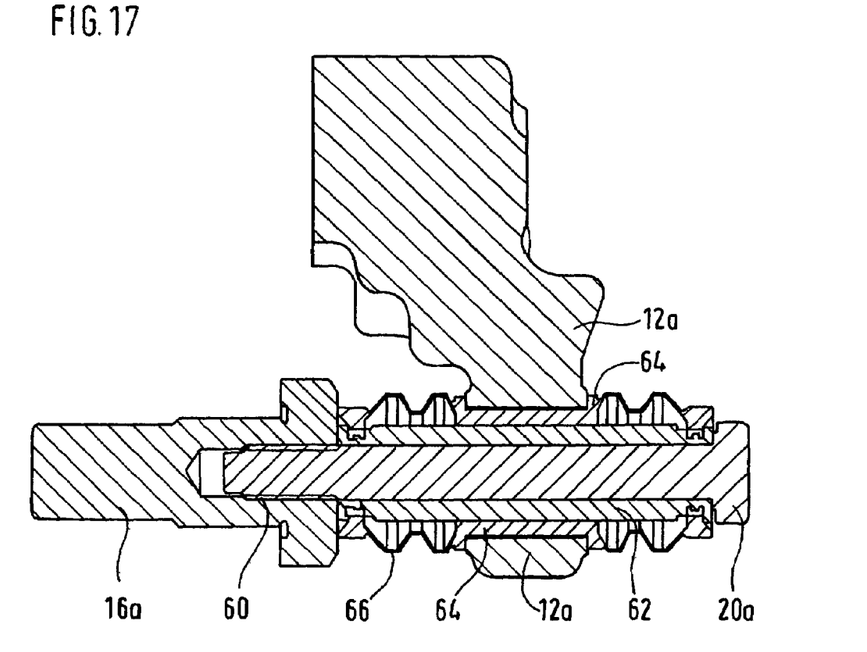
FIG. 17 shows the bolt guidance of the floating caliper in a brake according to the embodiment example according to FIGS. 1 to 10.

FIG. 17 shows a detail of the brake according to FIGS. 1 to 10, namely the coaxial arrangement of bolt 20a on which the floating caliper slides and of bolt 16a which supports the brake lining. As already explained above, centrally moulded out in bolt 16a is an inner thread 60, into which bolt 20a is screwed with a corresponding outer thread. A sleeve 62 surrounds bolt 20a. A further sleeve 64, which is rigidly connected to the caliper 12, slides on sleeve 62. The sliding face on the outside of sleeve 62 is sealed by a seal 66.

Figure 13:
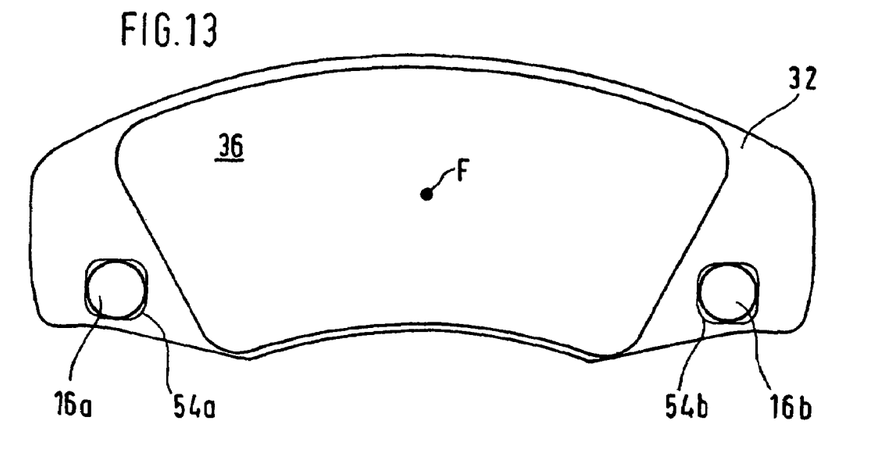
FIG. 13 shows the brake lining according to FIG. 12 in enlarged illustration.
Figure 18:
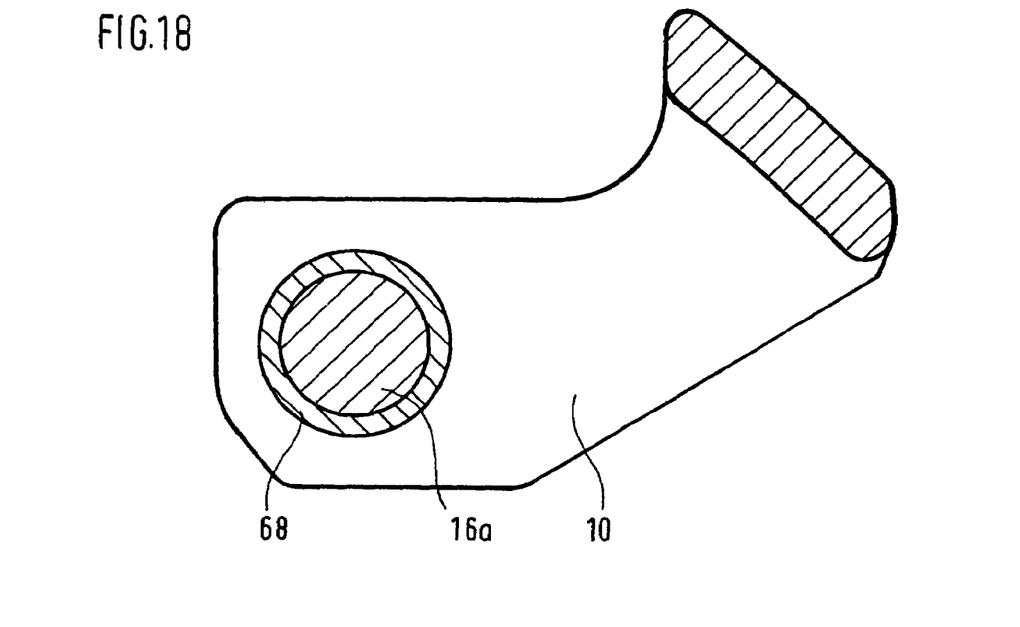
FIG. 18 shows part of the brake carrier with bolts and a spring sleeve.

FIG. 18 shows a detail of a preferred configuration of a brake carrier 10 with a bolt 16a, which in this case is provided with a sleeve 68, on which the brake lining is supported, either by the U-shaped recesses according to FIG. 8 or with a hole 54a or 54b according to FIGS. 12, 13. The sleeve 68 may have corrosion-impeding properties and/or comprise insulating properties between the brake lining and the bolt.

Figure 19:
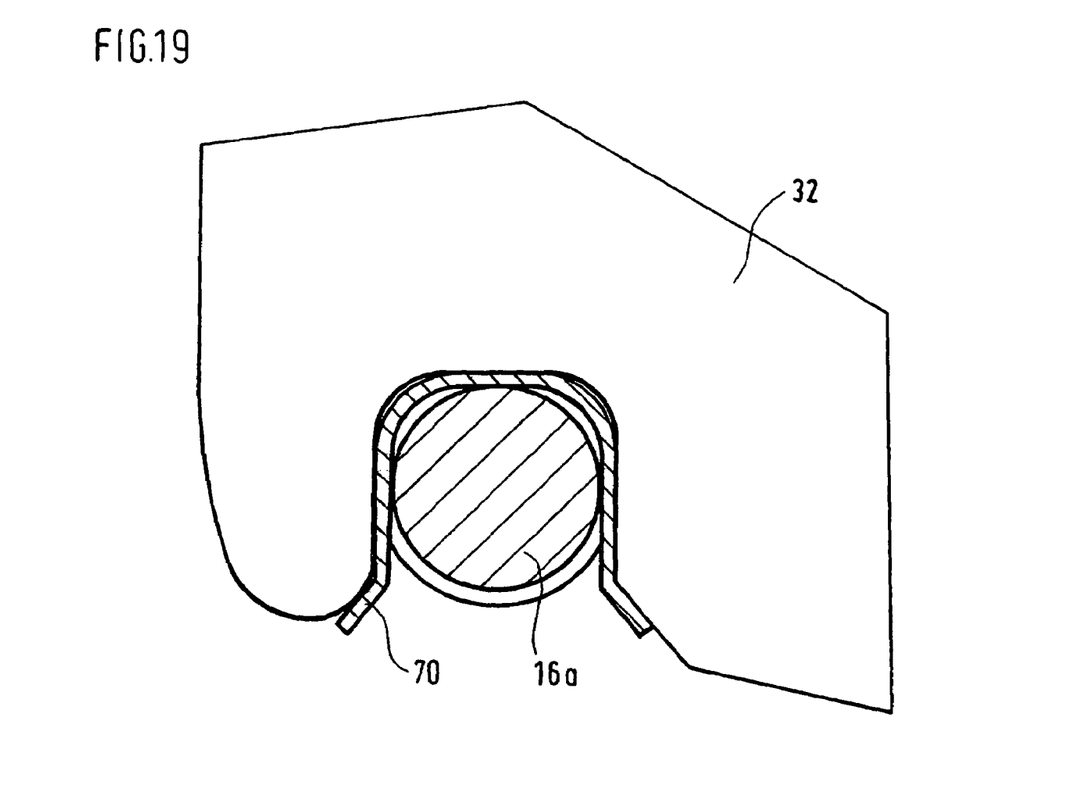
FIG. 19 shows part of a brake lining and a lining holding bolt with a metal damping sheet.

FIG. 19 shows a detail of a preferred configuration with a brake lining 32, which is intended to represent, for example, one of the brake linings 32a, 32b according to the above embodiment examples, and with a bolt 16a. The arrangement could correspondingly be configured with bolt 16b, a spring metal sheet 70 being arranged between the bolt and the brake lining for damping.

In a modification of the floating caliper brakes described above by way of example the invention can also be implemented with a fixed caliper brake. To this extent the brake carrier and the bolts and the associated features of the brake linings correspond to those of the floating caliper brake, only a different initiation of force into the brake linings taking place in the case of the fixed caliper. In the fixed caliper brake the recesses corresponding to reference symbols 40, 40' in FIG. 8 can preferably be configured as elongated holes. In these embodiments of the invention it is to be regarded as a particular advantage that, because the brake linings in a 4-piston brake are subject to tensile forces all the piston diameters can be the same size. It is not necessary to provide larger piston diameters on the run-out side.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Disc brake comprising a brake carrier provided with at least two bolts, for guiding a brake lining axially in relation to a brake disc, wherein the brake lining includes recesses for the bolts, in which recesses the at least two bolts are respectively received and engage in such a way, that during braking, tensile forces and compressive forces are absorbed on inner faces of the recesses, wherein central axes of the at least two bolts span a plane which has a smaller radial distance from a brake disc axis than a centre of area of a friction lining of the brake lining, wherein each of the at least two bolts makes linear contact in the respective recesses of the brake lining, and wherein the recesses in the brake lining in which the at least two bolts engage are U-shaped recesses, and wherein the relative arrangements and dimensions of the at least two bolts and the brake lining are such that when a braking force is initiated which decelerates the vehicle up to a maximum value in the range of approximately 0.1 g, only tensile forces act upon the brake lining.

2. Disc brake according to claim 1, wherein the plane passing through the central axes of the at least two bolts, has a radial distance smaller by at least 5% from the brake disc axis than the centre of area of the friction lining of the brake lining.

3. Disc brake according to claim 1, wherein the brake lining is arranged and guided on the at least two bolts on an outer side of the vehicle.

4. Disc brake according to claim 1, wherein the brake carrier is provided with four bolts, on which two brake linings are respectively supported and guided on an outer side of the vehicle and on an inner side of the vehicle, wherein the central axes of the four bolts span a plane, a radial distance of which from the brake disc axis is smaller than distances of the centres of area of the friction linings of the brake linings from the brake disc axis.

5. Disc brake according to claim 1, wherein the at least two bolts consist of stainless steel, or are provided with a coating of stainless material.

6. Disc brake according to claim 1, wherein the disc brake is a floating caliper brake, floating frame brake or fixed caliper brake.

7. Disc brake according to claim 1, wherein the plane defined by the central axes of the at least two bolts has an at least 10% smaller radial spacing from the brake disc axis than the centre of area of the friction lining of the brake lining.

8. Disc brake according to claim 1, wherein the plane defined by the central axes of the at least two bolts has an at least 15% smaller radial spacing from the brake disc axis than the centre of area of the friction lining of the brake lining.

9. Disc brake according to claim 1, wherein the central axes of the at least two bolts have a smaller radial distance from the brake disc axis than the centre of area of the friction lining of the brake lining.

10. Brake lining for a disc brake that supports the brake lining on two bolts, wherein the brake lining includes recesses for the bolts, in which recesses the bolts are respectively received and engage in such a way that, during braking, tensile forces and compressive forces imparted to the brake lining are absorbed on inner faces of the recesses, wherein the recesses are so dimensioned that a distance of a plane spanned by central axes of the bolts from an axis of a brake disc is smaller than a distance of the centre of area of a friction lining of the brake lining from the axis of the brake disc, wherein the brake lining is adapted to make linear contact with the bolts in each of the recesses, and wherein the recesses in the brake lining in which the at least two bolts engage are U-shaped recesses, and wherein the recesses are dimensioned and arranged such that, with a braking force capable of decelerating the vehicle up to a maximum value in the range of approximately 0.1 g, only tensile forces act upon the brake lining.

11. Disc brake comprising a brake carrier having at least two bolts for guiding a brake lining axially in relation to a brake disc, wherein the brake lining includes recesses for the at least two bolts respectively provided at a run-in side and at a run-out side of the brake, in which recesses the at least two bolts are respectively received and engage in such a way, that during braking, tensile forces and compressive forces acting on the brake lining are exerted on inner faces of the recesses, wherein central axes of the at least two bolts have a smaller radial distance from the brake disc axis than a centre of area of the friction lining of the brake lining, wherein each of the at least two bolts makes linear contact in the respective recesses of the brake lining, and wherein the recesses in the brake lining in which the at least two bolts engage are U-shaped recesses, and wherein the relative arrangements and dimensions of the at least two bolts and the brake lining are such that when a braking force is initiated which decelerates the vehicle up to a maximum value in the range of approximately 0.1 g, only tensile forces act upon the brake lining.

12. Disc brake comprising a brake carrier provided with at least two bolts, for guiding a brake lining axially in relation to a brake disc, wherein the brake lining includes recesses for the bolts, in which recesses the at least two bolts are respectively received and engage in such a way, that during braking, tensile forces and compressive forces are absorbed on inner faces of the recesses, wherein central axes of the at least two bolts span a plane which has a smaller radial distance from a brake disc axis than a centre of area of a friction lining of the brake lining, wherein each of the at least two bolts makes linear contact in the respective recesses of the brake lining, and wherein the recesses in the brake lining in which the at least two bolts engage are complete U-shaped recesses which are operative to surround and encompass the at least two bolts, and wherein the relative arrangements and dimensions of the at least two bolts and the brake lining are such that when a braking force is initiated which decelerates the vehicle up to a maximum value in the range of approximately 0.1 g, only tensile forces act upon the brake lining.

* * * * *